United States Patent Office 3,208,989
Patented Sept. 28, 1965

---

3,208,989
METHOD FOR THE POLYMERIZATION OF ETHYLENE USING A CATALYST OF TITANIUM OR VANADIUM TETRACHLORIDE AND TETRAETHYL LEAD
Ettore Bua, Padova, Alberto Malatesta, Ferrara, and Alessandro Negromanti, Milan, Italy, assignors to Montecatini, Società Generale per l'Industria e Chimica, Milan, Italy
No Drawing. Filed Mar. 23, 1956, Ser. No. 573,316
Claims priority, application Italy, Mar. 29, 1955, 4,512/55
4 Claims. (Cl. 260—94.9)

This invention relates to a process for polymerizing ethylene to solid, linear high polymers, and to a new polymerization aid for use in such process.

The production of crystalline, linear polyethylene with the aid of polymerization agents obtained by treating a compound of a heavy metal of the subgroup of Groups IV to VI of the Periodic Table with a compound of one of the elements forming the 2nd and 3rd columns of the Periodic Table, such as alkyl aluminum, alkyl zinc, and alkyl magnesium, is disclosed in the Belgian Patent No. 533,362.

Use of those polymerization agents has the advantage that the ethylene can be polymerized at low pressures and at a temperature below 100° C. to obtain good yields of the linear, high molecular weight polymers.

However, the use of those agents is not entirely free from disadvangtages arising from the extreme reactivity of the particular metallo-organic compounds used, especially those derived from aluminum, zinc and magnesium as mentioned above. Those compounds decompose in the air and ignite spontangeously. This tendency of the metallo-organic compounds to decompose and ignite spontaneously makes it necessary to observe critical conditions in preparing the polymerization agents and increases the ultimate cost of the agents in consequence.

The primary object of the present invention is to provide a new method for polymerizing ethylene which does not involve the use of the metallo-organic compounds mentioned above and which has advantages over the earlier methods.

Another object of the invention is to provide a new and novel polymerization agent for use in polymerizing ethylene to crystalline, linear polymers of high molecular weight.

These and other objects are accomplished by effecting polymerization of ethylene with the aid of a polymerization agent obtained by mixing a compound of a transition metal of Groups IV to VIII of the Periodic Table with an alkyl lead derivative, particularly tetraethyl lead, whereby a reaction product is formed which has the capacity to initiate and facilitate ethylene polymerization.

It had been known, heretofore, that tetraethyl lead aids the polymerization of olefines, especially ethylene, if the polymerization with the aid of the tetraethyl lead is carried out at very high temperatures of the order of 200° C. to 300° C. The ethylene polymers thus obtained are liquid and branched. Most likely, the polymerization with the aid of tetraethyl lead is effected through a mechanism of the "free radical" type. (See, for example, the paper by Taylor & Jones, Jr., Amer. Chem. Soc. 52, 1930, p. 1111; and Cramer, ibid, 56, 1934, p. 1234.)

Although the role of tetraethyl lead in ethylene polymerization to liquid branched polymers was known, it could not be predicted that tetraethyl lead could be substituted for the metallio-organic compounds derived from an element forming the 2nd and 3rd columns of the Periodic Table, in the reaction with the heavy metal or transition metal compound, to obtain new and different agents useful in the low-pressure polymerization of ethylene to linear, crystalline high polymers. In other respects, the alkyl lead behaves very differently from the metallo-organic compounds like alkyl aluminum, and thus it did not appear, a priori, that it could replace those metallo-organic compounds in the reaction with the transition metal compounds, to yield new polymerization agents.

By "transition metal" of Groups IV to VIII of the Periodic Table as used herein, we mean the transition metals defined and described as such at pages 103–106 and in chapter 20 of "Inorganic Chemistry," by T. Moeller, published by Wiley & Sons, New York, N.Y., 1952. The term includes the metals Ti, Cr, Mo, V, Mn, Fe and so on.

The alkyl lead compound has the formula $$Pb(R)_4$$

in which R may contain 2 to 6 carbon atoms. The presently preferred alkyl lead compound is tetraethyl lead.

The new polymerization agent may be prepared by mixing a compound of the transition metal such as a salt, including alcoholates derived from alcohols containing 1 to 6 carbon atoms and halides, with the alkyl lead compound, in an inert solvent. A halide of the transition metal is preferred.

Suitable solvents include, for instance, paraffinic solvents such as kerosene, n-heptane, iso-octane, and so on. Benzene may also be used.

The solvent selected should be anhydrous.

The transition metal salt and the alkyl lead may be dissolved or suspended in a hydrocarbon solvent of the same group, in the cold (0° C. to 20° C.) and the solutions or suspensions then brought together while maintaining a low temperature, for instance at ordinary room temperature.

The molar proportions of the reactants are preferably such that the alkyl lead is not greater than ten times the transition metal salt. Molar proportions of 1:1 to 10:1, preferably 1:1 to 5:1 are satisfactory.

The resulting composition is a suspension or dispersion of the reaction product of the transition mteal compound and alkyl lead in the inert hydrocarbon solvent.

The composition may be further diluted with solvent, if desired, and introduced into the reaction vessel, which should be previously thoroughly dried and evacuated because it is of general advantage to carry out the entire process in the absence of air and water.

In the autoclave, the polymerization agent obtained as described is caused to act on the monomeric ethylene.

The ethylene is preferably dried carefully before it is pumped into the autoclave.

Polymerization of the ethylene with the aid of the new polymerization agent is carried out at a temperature of 80° C. to 180° C., usually 120° C. to 150° C.

The polymerization agent may be prepared in the presence of the ethylene to be polymerized. In that modification of the method, a solution of the alkyl lead in the selected inert hydrocarbon solvent may be introduced into the autoclave under an atmosphere of an inert gas such as nitrogen, a suspension or solution of the transitioin metal salt in the same solvent may be added, and the ethylene may then be pumped into the autoclave. Ethylene may be pumped in during the polymerization as decrease in the pressure may indicate.

The polymerization can be carried out at a pressure between atmospheric pressure and about 30 atmospheres. Preferably, a light pressure, for example 15 to 30 atmospheres is used. This facilitates dissolution of the ethylene in the inert hydrocarbon solvent. By "inert" is meant that the hydrocarbon solvent does not react with the polymerization agent.

After the desired polymerization has been effected, the mass is cooled, excess ethylene is removed, and an alcohol such as n-butyl alcohol is added and mixed with the reaction mass for decomposing residues of the catalyst and dissolving decomposition products. The polymerizate is then removed from the polymerization vessel and successively thoroughly washed with an alcohol, acids (e.g., hydrochloric) and acetone to remove impurities. The final dried products, which occurs as a powder, comprises the crystalline, linear polyethylene.

At the temperature of 120° to 150° C., ethylene is rapidly polymerized, with the aid of the polymerization agent prepared from the transition metal salt and alkyl lead compound, to high molecular weight (50,000 and up to 100,000 or higher) polymers which appear highly crystalline under the X-rays and have a substantially linear sturcture. The polyethylenes obtained are similar, in all respects, to the polyethylenes described in the Belgian Patent supra, and obtained using the polymerization agent prepared by reacting the heavy metal compound with metallo-organic compounds of the type of triethyl aluminum.

The following examples are given to illustrate presently preferred specific embodiments of the invention, it being understood that these examples are not intended as limitative.

Example 1

1.3 g. tetraethyl lead dissolved in 120 cc. of a kerosene of paraffinic nature are introduced under nitrogen atmosphere into a stainless steel shaking autoclave of 400 cc. capacity. The autoclave is filled with ethylene and 0.75 g. of $TiCl_4$ dissolved in 120 cc. of the same kerosene are added. Heating is started and ethylene is pumped into the autoclave up to a pressure of 25 atmospheres. During the reaction the temperature is kept at about 120° C., and the pressure at about 25 atmospheres by adding ethylene as often as the pressure drops below 20 atmospheres. After 40 hours the autoclave is cooled; after removal of the excess ethylene, 100 cc. of n-butyl alcohol are added and the mixture is kept in agitation for one hour. The polymer formed is withdrawn from the autoclave, thoroughly washed with n-butylalcohol, acids and acetone. 65 g. of a powdery polymer are thus obtained. This polymer has a molecular weight of 100,000 and appears highly crystalline under the X-rays.

Example 2

1.3 g. tetraethyl lead dissolved in 120 cc. of a kerosene of paraffinic nature are introduced under nitrogen atmosphere into a stainless steel shaking autoclave of 400 cc. capacity. A suspension of 0.6 g. $TiCl_4$ in 120 cc. of the same kerosene is introduced into the autoclave, filled with nitrogen. Heating is started and ethylene is pumped into the autoclave, up to 25 atmospheres pressure. During the reaction, the temperature is kept at about 120° C. and the pressure at about 25 atmospheres by adding ethylene as often as the pressure drops below 20 atmospheres. After 38 hours the autoclave is cooled; after removal of the excess ethylene, 100 cc. of n-butyl alcohol are added and the mixture is kept in agitation for one hour. The polymer formed is withdrawn from the autoclave, thoroughly washed with n-butyl alcohol, acids and acetone.

42 g. of a powdery polymer are obtained. The polymer has a molecular weight of about 100,000 and appears highly crystalline under the X-rays.

Example 3

4.4 g. of a mixture containing 50% $MoCl_3$ and 50% $MoCl_5$ and a solution of 12 g. (0.037 moles) tetraethyl lead in 250 cc. m-heptane are introduced into a 1750 cc. autoclave filled with nitrogen. Ethylene is then introduced in the cold up to a pressure of 16 atmospheres and the autoclave is heated up to 130° C. and kept at this temperature for 24 hours.

After said period of time the unreacted gases are released and from the opened autoclave a brown, semisolid mass impregnated with the solvent is withdrawn. The reaction product is purified from the inorganic products present by treatment with dilute nitric acid and methanol. The polymer obtained is then filtered, washed and dried by heating under vacuum. 30 g. of a slightly yellow-colored solid polymer are thus obtained. This product appears highly crystalline under the X-rays and shows, in tetralin solutions at 135° C., an intrinsic viscosity higher than 1.

Example 4

A solution of 12 g. (0.037 mole) tetraethyl lead in 200 cc. n-heptane is introduced under nitrogen atmosphere into an autoclave of 2150 cc. capacity. Ethylene is then pumped in up to 15 atmospheres and the autoclave is heated to 81° C. at this temperature, a solution of 3.5 g. $VCl_4$ in 50 cc. of n-heptane is added. The temperature is brought to 145° C. Twenty-four hours from the beginning of the run the unreacted gases are released and a liquid mass having a small amount of solid products in suspension is withdrawn from the autoclave. The purification is carried out similarly as described in the preceding example. 12 g. of a solid polymer in the form of a very fine, slightly yellow-colored powder, which appears highly crystalline under the X-rays are thus obtained.

Since various changes and modifications may be made in specific details in practicing the invention, without departing from the spirit and scope of the invention, it is to be understood that it is not intended to limit the invention except as defined in the appended claims.

What is claimed is:

1. A process for the conversion of ethylene to a normally solid polymerizate which comprises contacting ethylene under polymerization conditions with a catalyst obtained by mixing tetraethyl lead and titanium tetrachloride.

2. A process for polymerizing ethylene to crystalline linear high polymers, which process comprises contacting monomeric ethylene, under polymerization conditions and in paraffinic kerosene, with a catalyst obtained by mixing titanium tetrachloride with tetraethyl lead.

3. A process for polymerizing ethylene to crystalline linear high polymers, which process comprises contacting monomeric ethylene, under polymerization conditions and in n-heptane, with a catalyst obtained by mixing titanium tetrachloride with tetraethyl lead.

4. A process for polymerizing ethylene to crystalline linear high polymers, which process comprises contacting monomeric ethylene, under polymerization conditions and in n-heptane, with a catalyst obtained by mixing vanadium tetrachloride with tetraethyl lead.

References Cited by the Examiner

UNITED STATES PATENTS

| | | | |
|---|---|---|---|
| 1,914,558 | 6/33 | Craver | 252—431 |
| 2,084,687 | 6/37 | Jespersen | 252—431 |
| 2,440,498 | 4/48 | Young | 252—431 |
| 2,700,663 | 1/55 | Peters | 260—94.9 |
| 2,710,854 | 6/55 | Seelig | 260—94.9 |
| 2,818,416 | 12/57 | Brown et al. | 260—429.5 |
| 2,822,357 | 2/58 | Brebner et al. | 260—94.9 |
| 2,824,116 | 2/58 | Wilson | 252—472 |

FOREIGN PATENTS 537,792   4/55   Belgium.

OTHER REFERENCES

Browne et al.: "J.A.C.S., 49, pp. 830–838 (1927).

JOSEPH L. SCHOFER, Primary Examiner.

J. FROME, A. WHIKELSTEIN, P. E. LANHAM, L. H. GASTON, MORRIS LIEBMAN, WILLIAM N. SHORT, JAMES A. SEIDLECK, Examiners.